March 17, 1970

SEIZO OHTA 3,501,200

SEAT REINFORCING PLATE CONSTRUCTION

Filed July 1, 1968

INVENTOR.
SEIZO OHTA
BY McGlew and Toren
ATTORNEYS

March 17, 1970  SEIZO OHTA  3,501,200
SEAT REINFORCING PLATE CONSTRUCTION
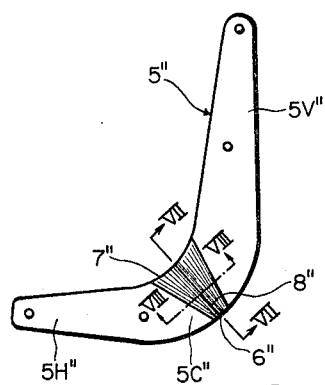
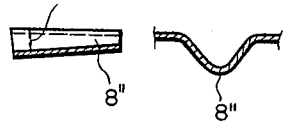
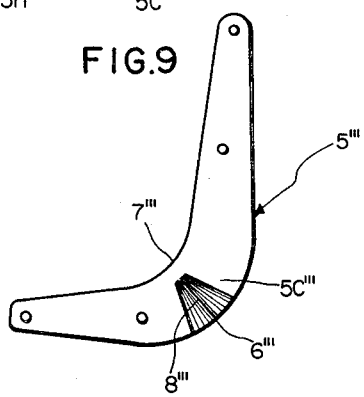
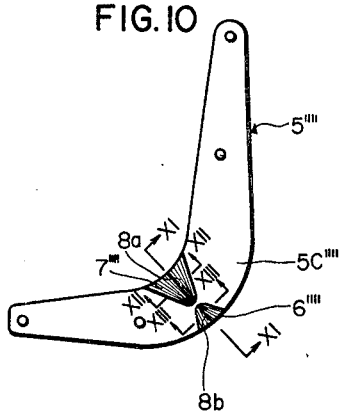
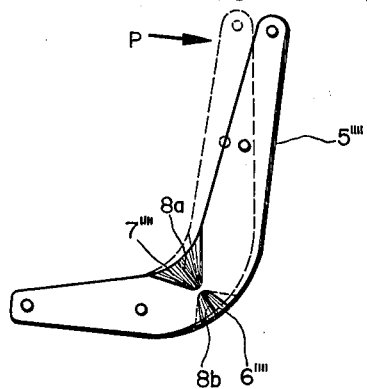
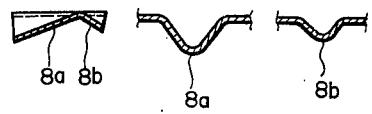
INVENTOR.
SEIZO OHTA United States Patent Office 3,501,200
Patented Mar. 17, 1970

3,501,200
SEAT REINFORCING PLATE CONSTRUCTION
Seizo Ohta, Toyota-shi, Japan, assignor to Toyota Jidosha
Kogyo Kabushiki Kaisha, Toyota-shi, Aichi-ken, Japan
Filed July 1, 1968, Ser. No. 741,490
Claims priority, application Japan, July 12, 1967,
42/59,756
Int. Cl. A47c 7/02, B60r 21/00; B60n 1/02
U.S. Cl. 297—454                                8 Claims

ABSTRACT OF THE DISCLOSURE

A seat construction, particularly for automobiles, includes an L-shaped metal plate on at least one side or between the seat sides which joins a seat back portion to a seat bottom portion. The metal plate is made with a transverse corrugation or projection adjacent the transition area between the upwardly extending back portion and the horizontally extending bottom portion. The transverse corrugation is located and constructed to permit the relative bending of the two portions of the L-shaped metal plate in order to provide a shock force absorption while permitting collapse of the seat parts during an impact such as would occur in an automobile collision.

SUMMARY OF THE INVENTION

This invention relates, in general, to a seat construction and, in particular, to a new and useful L-shaped metal plate member for joining a back portion and a bottom portion of a seat together which is constructed to partly collapse and absorb shock when subjected to a severe impact such as in an automobile collision.

At the present time, it is known to join a seat back portion and a seat bottom portion together by use of a side or intermediate joining plate of generally L-shaped construction. Such plates are normally uniformly rigid throughout their extent and includes a widened curved transition portion between a horizontally extending seat portion and a vertically or obliquely extending back portion. The construction is such that the plate would normally resist bending under normally expected impact loads in order to maintain the two seat elements in their normal or fixed oriented position.

In accordance with the present invention, there is provided a connecting plate element which is formed in a manner such that it will collapse partially during impact in order to absorb any shock forces which are produced and, thereby prevent the transmission of the impact shock forces to the occupant of the seat. For this purpose, the invention includes a seat constructed with a side or intermediate connecting plate between a seat bottom portion and a seat back portion which is formed with a transverse projection or corrugation providing an area facilitating the bending of a horizontal plate portion in respect to a vertical plate portion. In accordance with one embodiment of the invention, the seat is formed with a transverse corrugation or ridge in the area of the juncture of the horizontal portion to the vertical portion and the extent or height of the ridge varies from a maximum at the interior (exterior) of the seat to a minimum or substantially zero projection adjacent the exterior (interior) of the seat in order to facilitate an inward (or outward) bending movement to an impact against the back in a direction to cause the back portion of the seat to collapse in respect to the bottom.

The invention contemplates various other embodiments of projection, including a projection extending completely through the L-shaped plate providng a corrugation area which would be a maximum on one side and a lesser amount on the other of the seat connecting plate for example.

Another embodiment contemplates the use of two ridge formations, one extending inwardly from one side and, another extending inwardly from the other side, the ridge either varying or being constant in size from one side to the other. In this manner, the impact forces which act from either side of the seat back may be absorbed by a collapsing movement of the substantially vertical back portion of the bar relative to the substantially horizontal bottom portion, regardless of whether the impact is from the front of the vehicle or from the rear of the vehicle.

Accordingly, it is an object of the invention to provide a seat connecting bar or plate which includes a horizontal seat reinforcing portion and a vertical back reinserting portion and with a weakened area defined thereon permitting a collapsing movement of the vertical portion in respect to the horizontal portion to absorb shock during impact on a portion of the seat.

A further object of the invention is to provide an L-shaped reinforcing seat member having an area defined between a horizontal portion and a vertical portion with a projection or corrugation extending inwardly from one or both edges of the L-shaped member in accordance with the amount of collapsing movement and in accordance with the direction of collapsing movement which is desired during an impact force acting on the seat back, the corrugation being of a strength to permit absorption of a major portion of the impact forces by collapsing movement of the two seat parts.

A further object of the invention is to provide a seat construction and a reinforcing bar element for a seat which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:
FIG. 6 is a view similar to FIG. 3 of another embodiment of the invention;
FIG. 7 is a section taken on the line VII—VII of FIG. 6;
FIG. 8 is a section taken on the line VIII—VIII of FIG. 6;
FIG. 9 is a side elevational view similar to FIG. 3 of still another embodiment of the invention;
FIG. 10 is a side elevational view similar to FIG. 3 of another embodiment of the invention;
FIG. 11 is a section taken on the line XI—XI of FIG. 10;
FIG. 12 is a section taken on the line XII—XII of FIG. 10;
FIG. 13 is a section taken on the line XIII—XIII of FIG. 10;
and FIG. 14 is a side elevational view similar to FIG. 10 indicating the collapsing movement of the back portion relative to the bottom portion of the seat plate.

GENERAL DESCRIPTION OF THE PREFERRED EMBODIMENTS

Figure 1:
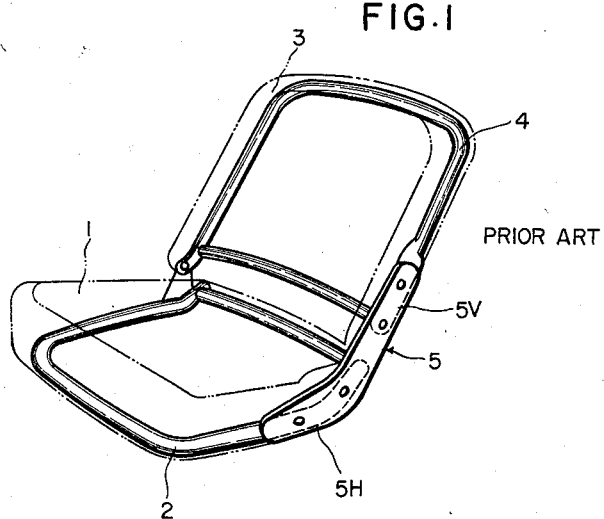
FIG. 1 is a schematic perspective view of a seat frame of the prior art.
Figure 2:
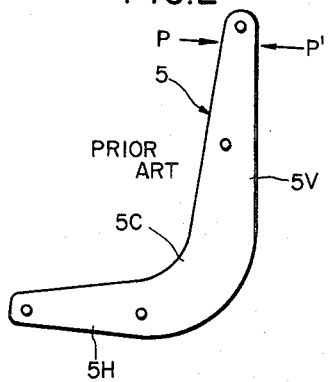
FIG. 2 is a side elevational view of a conventional metal plate member for joining a seat rear portion to a seat bottom portion.

Referring to the drawings, in particular, in FIGS. 1 and 2, prior art construction of a seat and side reinforcing plate 5 are indicated. The seat includes a cushion 1 engaged over a frame member 2 which is secured to a lower portion 5H of a holding plate or reinforcing plate generally designated by 5. A seat back portion includes a back frame 4 secured to an upper portion or vertical portion 5V of the reinforcing plate 5. A cushion 3 is formed over the frame 4. The plate 5 is of generally L-shaped configuration and it is made with a widened area at a central part 5C formed between the vertical part 5V and the horizontal part 5H.

Figure 3:
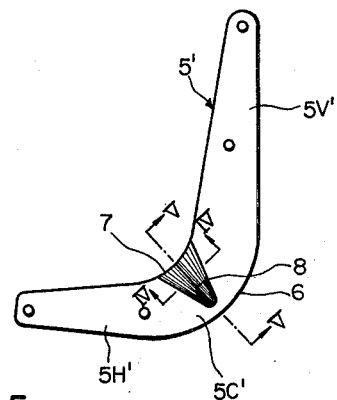
FIG. 3 is a view similar to FIG. 2 of a joining plate for seat constructed in accordance with the invention.
Figure 4:
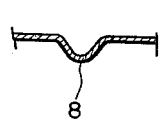
FIG. 4 is a section taken on the line IV—IV of FIG. 3.
Figure 5:
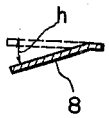
FIG. 5 is a section taken on the line V—V of FIG. 3.

In accordance with the invention, as indicated in FIGS. 3 to 5, there is provided a connecting plate or reinforcingplate 5″ which includes a central area 5C′ having a single transverse corrugation or projection ridge 8 which is formed with a maximum indentation or projecting height at the interior side or edge 7. The projection height tapers off toward the opposite or exterior surface 6. The construction is such that when an impact force is imparted to the seat in the direction P, there will be some deformation of the connecting plate 5′. The corrugation 8 permits a relative movement between the vertical part 5V′ and the horizontal part 5H′ and an absorption of the impact forces by such movement. If the impact forces are directed in accordance with the arrow indicated by P′ an inward collapsing movement between the two parts 5V′ and 5H′ will take place to absorb the impact shock force.

In the embodiment illustrated in FIGS. 6 through 8, a connectinm plate 5″ for joining a seat bottom portion to a seat top portion, includes a central part 5C″ having a transverse corrugation or projecting ridge 8″ which is a maximum at the inner surface or edge 7″ and which tapers gradually to a minimum at the exterior edge 6″.

In the embodiment illustrated in FIG. 9, a connecting plate 5‴ includes a central portion of joining portion 5C‴ with a transverse ridge or corrugation 8‴ which is a maximum at the exterior surface 6‴ and tapers inwardly to substantially zero before the interior surface 7‴.

In the embodiment illustrated in FIGS. 10 to 13, a connecting plate 5⁗ includes a central part 5C⁗ having two sets of projections 8a and 8b which extend inwardly from respective edges 7⁗ and 6⁗, respectively. The projection 8a and 8b are a maximum at the outer surface and taper inwardly to zero.

In FIG. 14, the connecting plate 5⁗ is indicated in solid lines in the configuration it would assume after an impact force P is applied in the direction indicated. The deformation which has taken place will permit the absorption of the impact force and prevents serious injury to the occupant of the seat.

While specific embodiments of the invention have been shown and described in detail to illustrate the application of the inventive principles, it will be understood that the invention may be embodied otherwise without departing from such principles.

What is claimed is:

1. A plate for securing the bottom and back portions of a seat together, comprising a substantially L-shape plate having a substantially horizontally extending bottom portion, a substantially vertically extending rear portion, and a central portion between said bottom and rear portions with a portion thereof extending transversely and projecting out of the plane of said plate for facilitating the collapse of said rear portion relative to said bottom portion when said plate is subject to impact whereby to provide an absorption of the shock of the impact.

2. A plate, according to claim 1, wherein said portion of the material extending transversely provides a wave-shaped projection of a maximum transverse extent adjacent at least one side of said L-shaped plate and tapering to a minimum projection intermediate the sides of said plate.

3. A plate, according to claim 2, wherein the maximum projection of the material is adjacent the inside of said plate.

4. A plate, according to claim 2, wherein the maximum projection of the material is adjacent the outside of said plate.

5. A plate, according to claim 1, wherein said portion of the material extending transversely is of wave-shaped configuration and is a maximum at the interior portion of said plate and extends to a minimum at the exterior portion of said plate.

6. A plate, according to claim 1, wherein said portion of the material extending transversely is of wave-shaped configuration and is a maximum at the exterior portion of said plate and tapers inwardly toward the interior of said plate.

7. A plate, according to claim 1, wherein said portion of the material extending transversely includes two wave-shaped elements having a maximum laterally extending portion adjacent each exterior surface and tapering inwardly to substantially zero intermediate the sides of said plate.

8. A seat, according to claim 1, including the seat back portion joined to said substantially vertical rear portion of said plate and a seat bottom portion joined to said substantially horizontally extending portion of said plate.

References Cited

UNITED STATES PATENTS

| 2,159,098 | 5/1939 | Morgan | 297—455 |
| 3,037,812 | 6/1962 | Monroe | 297—355 |

CASMIR A. NUNBERG, Primary Examiner

U.S. Cl. X.R.
296—65; 297—216